G. W. KENAN.
Carriage Spring.
No. 107,386. Patented Sept. 13, 1870.
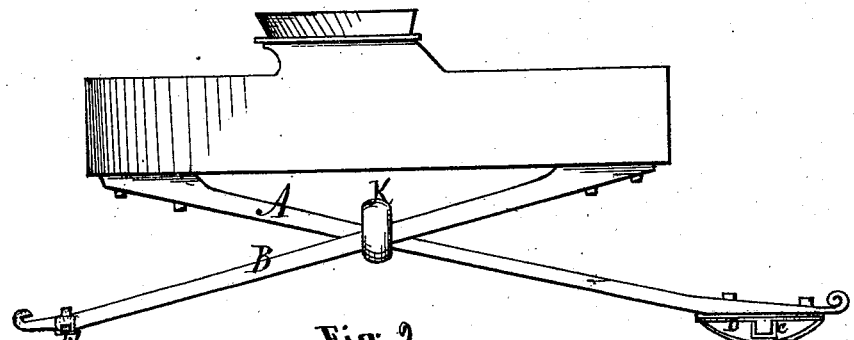
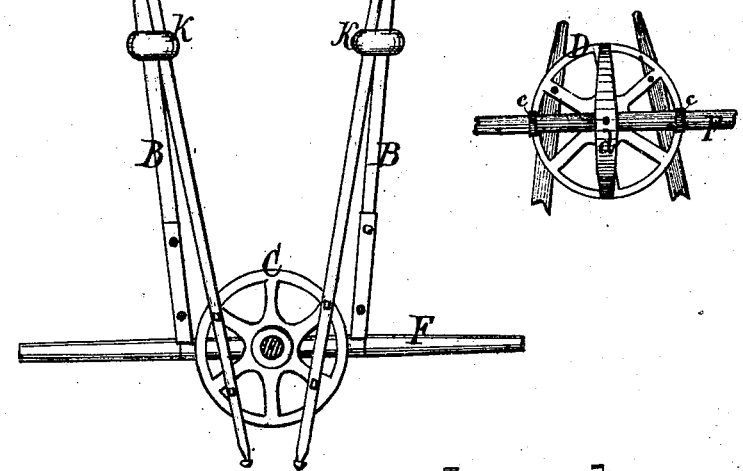
Witnesses.
Parker H. Sweet Jr.
E. R. Brown
Inventor.
George W. Kenan,
by J. C. Threake
Attorney.

United States Patent Office.

GEORGE W. KENAN, OF UPPER SANDUSKY, OHIO.

Letters Patent No. 107,386, dated September 13, 1870.

IMPROVEMENT IN BUGGY-SPRINGS.

The Schedule referred to in these Letters Patent and making part of the same.

*To all whom it may concern:*

Be it known that I, GEORGE W. KENAN, of Upper Sandusky, in the county of Wyandot and State of Ohio, have invented a new and useful Buggy-Spring; and I do hereby declare that the following is a full, clear, and exact description thereof, sufficient to enable those skilled in the art to which my invention appertains to make and use the same, reference being had to the accompanying drawing, in which—

Figure 1 is a side view of my improvement, as applied to a buggy or light wagon.

Figure 2 is a top view of the springs, with the body removed.

Figure 3 is a view of the under side of the fifth-wheel.

The nature of my invention consists in the use of blocks of India rubber, for strengthening the springs at the points where they cross each other; and, also, in the peculiar arrangement and attachment of the fifth-wheel to the front axle.

My improvement is capable of being applied to different kinds of vehicles, but it is peculiarly adapted to buggies and light wagons.

The springs consist of bars A A and B B of elastic wood or metal. Their upper ends are flattened on the upper side, and their lower ends are flattened on the lower side.

The upper ends of the bars A A are bolted to the bottom of the wagon-body at the rear end, and their lower ends are bolted to the upper section C of the fifth-wheel.

The upper ends of the bars B B are bolted to the bottom of the wagon-body at the front end, and their lower ends are bolted to the rear axle E.

At the points where the springs A B cross each other, they pass through solid India-rubber balls or blocks K, which are formed with holes large enough for them to pass through, and fit closely.

These blocks serve to strengthen the springs, and add to the steadiness of the motion, and they prevent much of the sudden jolting and jarring of the vehicle in passing over rough ground. They also assist in preserving the level position of the body of the vehicle, should the weight be unequally distributed.

The lower section D of the fifth-wheel has formed on its under side two staples or loops, C, diametrically opposite each other, corresponding in size with the thickest portion of the front axle.

It is also formed with a bar, $d$, extending diametrically across it, at right angles with the loops C.

The front axle F passes through the loops C, and between the section D and bar $d$, and is secured by the king-bolt, without the use of any other bolts.

What I claim as new, and desire to secure by Letters Patent, is—

1. The rubber balls or blocks K, in combination with the springs A B, substantially as shown and described.

2. The lower section D of the fifth-wheel, formed with the loops C and bar $d$, substantially as shown and described.

GEORGE W. KENAN.

Witnesses:
A. KAIL,
JACOB TRIBOLET.